United States Patent
Durst et al.

[11] Patent Number: 5,911,621
[45] Date of Patent: Jun. 15, 1999

[54] APPARATUS FOR DEBONING FISH FILLETS

[76] Inventors: Paul William Durst, R.R. # 1, Morpeth, Ontario, Canada, N0P 1X0; Kenneth Norman Builder, 3907 Governer's Road, Lynden, Ontario, Canada, L0R 1T0

[21] Appl. No.: 09/031,773

[22] Filed: Feb. 27, 1998

Related U.S. Application Data

[63] Continuation-in-part of application No. 08/686,454, Jul. 25, 1996, abandoned.

[51] Int. Cl.$^6$ ..................................................... A22C 25/16
[52] U.S. Cl. ............................................ 452/135; 452/83
[58] Field of Search ..................................... 452/135, 136

[56] References Cited

U.S. PATENT DOCUMENTS

| | | | |
|---|---|---|---|
| 3,911,530 | 10/1975 | Kalfsbeek et al. | 452/83 |
| 4,631,780 | 12/1986 | Leining | 452/133 |
| 5,135,430 | 8/1992 | Jordan | 452/83 |
| 5,525,101 | 6/1996 | Söderlind | 452/135 |

FOREIGN PATENT DOCUMENTS

| | | |
|---|---|---|
| 26 41 427 | 5/1977 | Germany . |
| WO 92/12641 | 8/1992 | WIPO . |
| WO 94/10848 | 5/1994 | WIPO . |

*Primary Examiner*—Willis Little
*Attorney, Agent, or Firm*—Rogers & Scott

[57] ABSTRACT

In accordance with this invention, there is provided apparatus for removing pin bones from fish fillets, the apparatus having a rotatable bone pulling cylinder and a puller plate defining a pin bone receiving space between the bone pulling cylinder and puller plate. The bone pulling cylinder has a cylindrical surface which is adapted to snag pin bones extending from a fish fillet disposed adjacent to the bone pulling cylinder and puller plate, and the puller plate has a forward portion profiled to have a radius of curvature which is commensurate with the radius of curvature of the cylindrical surface of the bone pulling cylinder. The puller plate is slidably mounted to a body and adapted to be slid toward the bone pulling cylinder to bring the leading edge to mate with the bone pulling cylinder, the relative position of the puller plate to the bone pulling cylinder being maintained by mounting openings provided in the puller plate and the body, and by fasteners received in the mounting openings which couple the puller plate to the body. The fasteners are adapted to apply a minimum predetermined tension to the leading edge of the puller plate over a selected arc length of the bone pulling cylinder so that any pin bones received between the puller plate and the bone pulling cylinder are squeezed, and continued rotation of the bone pulling cylinder withdraws the pin bones from the fish fillet.

7 Claims, 8 Drawing Sheets

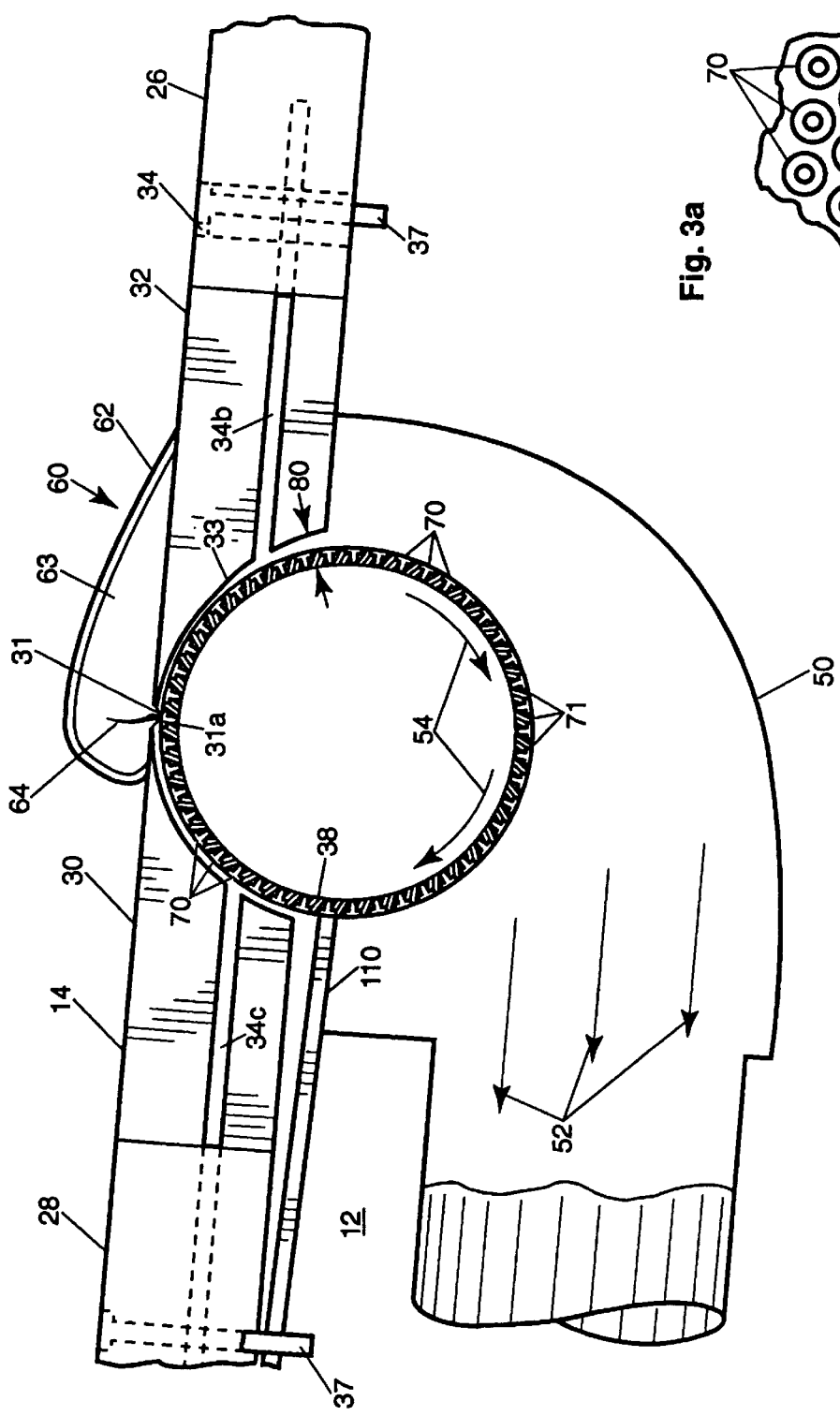
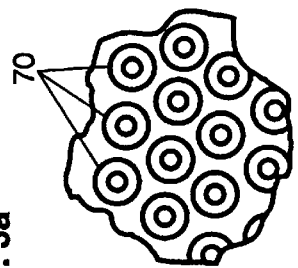
Fig. 3
Fig. 3a

APPARATUS FOR DEBONING FISH FILLETS

This is a continuation-in-part of U.S. Ser. No. 08/686,454, filed Jul. 25, 1996 now abandoned.

FIELD OF THE INVENTION

This invention relates to the food processing industry in general and, in particular, relates to processing fresh and salt water fish species for human consumption. More particularly, this invention relates to the removal of bones from fish fillets.

BACKGROUND OF THE INVENTION

Fresh and salt water fish species are well-known as foods for human consumption. Fish processing operations typically involve a number of steps including gutting the fish, removing the head and tail, removing scales, separating the fish fillets from the backbone, and washing and packaging the separated fillets. Many of these steps are automated, and are performed in large capacity machines. Although different fish species are processed in different manners, this invention is of particular interest for processing fish fillets.

One of the drawbacks of fish fillets is the presence in the fillets of thin or fine fish bones, which are commonly referred to as pin bones. These bones are all that remain of the fish skeleton, the bulk of which has been removed during typical fish meat processing as described above. However, pin bones may be secured firmly in the fish fillet flesh, and thus, when the backbone is separated from the fish fillet, remain in the flesh instead of being removed with the remainder of the backbone. The presence of theses pin bones in the fish fillet makes the fillet more difficult and awkward to eat. During cooking, the flesh becomes easily separable from the pin bones. However, the pin bones are typically very fine and may not be easily noticed by the person eating the fish. Thus, there is a tendency for the pin bones to be taken into the mouth, and swallowed. This can lead to choking, or other discomfort in the event that the sharp pin bone is not removed prior to eating the fish.

In the past, attempts have been made to remove pin bones by various mechanisms. For example, U.S. Pat. No. 2,771,511 relates to a tool and a method for deboning fish. The tool, in essence, comprises a pair of tweezers for gripping and pulling a large number of pin bones from the fish fillet simultaneously. However, the tool is manually operated and awkward to use. An attempt to automate the process was provided in U.S. Pat. No. 4,945,607 which relates to a gripping device which automatically extends, opens and closes the jaws for the purpose of gripping the ends of the pin bones to remove them from the fish fillet. However, each of these devices require a precise positioning of the gripping jaws in order to have the desired effect of removing pin bones.

A departure from the "tweezer" approach is embodied in the inventions described in WO 94/10848 and WO 92/12641 where the pin bones are removed by being nipped or snagged between a rotating cylinder and a counter-pressure device.

In both of these inventions, the counter-pressure devices are pivotally mounted in order to accommodate the pin bones as they pass between the counter-pressure device and the cylinder. During such pivoting, the counter-pressure devices move away from the rotating cylinder, thereby defining a gap. This gap is dynamic in that its magnitude will vary during operation of the devices according to the number, size and position of any snagged bones. The counter-pressure devices are biased to return to a start position corresponding to minimum predetermined gap by a resilient member comprising a coil spring, in WO 92/12641 and pin-mounted O-rings in WO 94/10848.

These devices fail to apply and maintain a minimum pressure and tension to snagged pin bones during their withdrawal from the fish fillet, with the result that the bones are often broken and repeated passes of the devices on the fish fillet are required to fully withdraw the pin bones. Such repeated handling inevitably results in bruising of the flesh and scraping of flesh which must be discarded. This diminishes the value of the fillet and also wastes time.

An object of this invention is to address the above-described problems and to maximize the value of a fish fillet by withdrawing pin bones from the fillet with minimal flesh being scrapped and with virtually no bruising of the fillet.

SUMMARY OF THE INVENTION

In accordance with this invention, there is provided apparatus for removing pin bones from fish fillets, the apparatus having a rotatable bone pulling cylinder and a puller plate defining a pin bone receiving space between the bone pulling cylinder and puller plate. The bone pulling cylinder has a cylindrical surface which is adapted to snag pin bones extending from a fish fillet disposed adjacent to the bone pulling cylinder and puller plate, and the puller plate has a forward portion profiled to have a radius of curvature which is commensurate with the radius of curvature of the cylindrical surface of the bone pulling cylinder. The puller plate is slidably mounted to a body and adapted to be slid toward the bone pulling cylinder to bring the leading edge to mate with the bone pulling cylinder, the relative position of the puller plate to the bone pulling cylinder being maintained by mounting openings provided in the puller plate and the body, and by fasteners received in the mounting openings which couple the puller plate to the body. The fasteners are adapted to apply a minimum predetermined tension to the leading edge of the puller plate over a selected arc length of the bone pulling cylinder so that any pin bones received between the puller plate and the bone pulling cylinder are squeezed, and continued rotation of the bone pulling cylinder withdraws the pin bones from the fish fillet.

BRIEF DESCRIPTION OF THE DRAWINGS

Reference will now be made to the attached drawings which depict, by way of example only, a preferred embodiment of the invention in which:

FIG. 3 is a schematic cross-section drawn to a larger scale of a portion of the fish deboning device of FIG. 1 drawn along line 3—3;

FIG. 3a is a plan view drawn to a larger scale which shows the surface of a portion of the bone pulling cylinder;

DETAILED DESCRIPTION OF PREFERRED EMBODIMENTS

Figure 1:
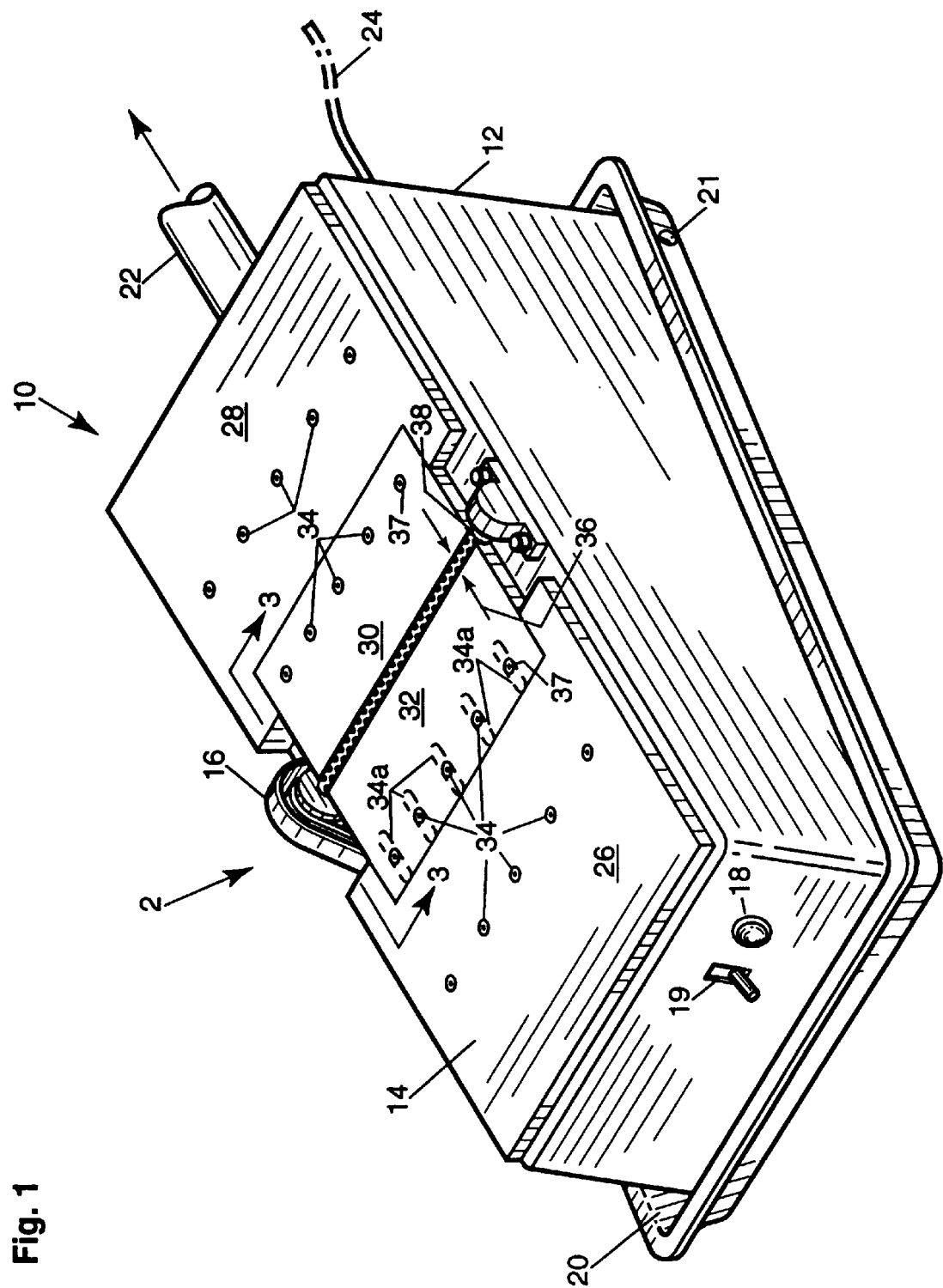
FIG. 1 is a perspective view showing a device for deboning fish fillets according to the present invention.

According to the present invention, there is provided a device for deboning fish fillets which is indicated generally in FIG. 1 by reference numeral 10. The fish fillet deboner 10 has a body 12 which includes an upper surface 14, a chain guard 16, a motor control 18, and on/off reverse switch 19 and a collection tray 20. In the most preferred form of the invention, the upper surface 14 is sloped, and is higher at the back. The collection tray 20 has a drain 21 and is formed around the perimeter of the base of the device. Also shown are a vacuum attachment 22 and electrical connections 24.

The upper surface 14 of the fish fillet deboning device 10 includes first and second top plates 26 and 28 respectively, into which are set a puller plate 32 and a guide plate 30, each having a length of twelve inches. Each of the plates 26, 28, 30 and 32 include a plurality of countersunk mounting openings 34, for fasteners 37. In the embodiment shown, there are five such openings distributed over the entire length of the puller and guide plates. Such mounting openings 34 in the puller plate 32 preferably include elongated slots 34a, as explained below. The fasteners attach the plates to the main body 12.

The guide plate 30 is preferably formed from food grade polyethylene, and machined to have a radius along a forward portion. The puller plate 32 is preferably formed from food grade material machined to have a double radius along a forward portion as described below. The preferred material is Ertalyte® which is very strong and which can be accurately machined using custom tooling. It is also characterized by negligible water absorption and is durable, both of which are very desirable features in this application.

The plates 30 and 32 are adjacent, but have a gap therebetween, identified as 36. This may be referred to as the fillet registering opening. Additionally, there is shown a bone pulling cylinder in the form of a perforated cylinder 38, which is at least partially exposed through the fillet registering opening 36. The bone pulling cylinder 38 is described in more detail below.

Figure 2:
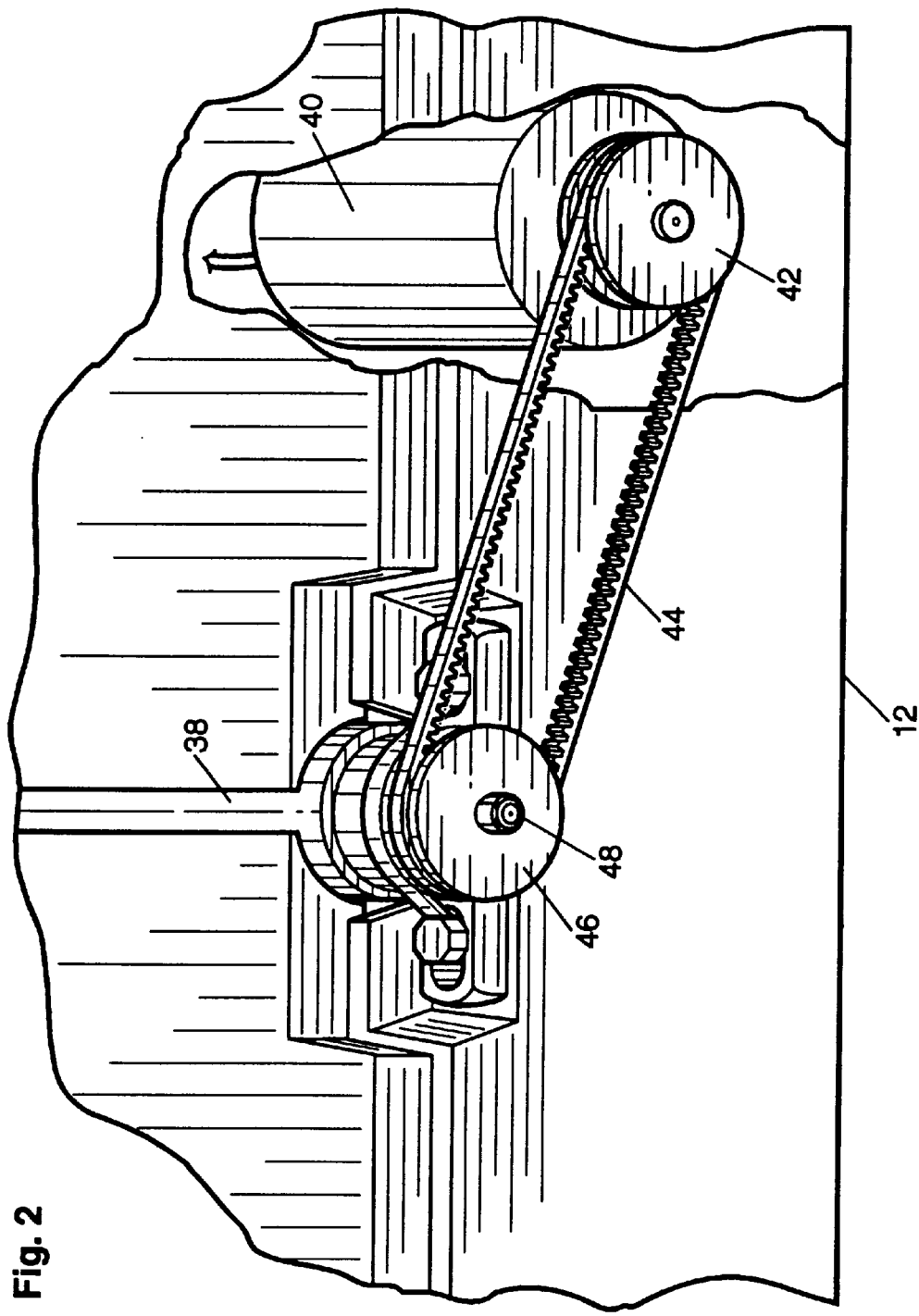
FIG. 2 (drawn to a larger scale) shows a motor drive assembly for rotating a bone pulling cylinder forming part of the device of FIG. 1.

An electric motor 40 shown in FIG. 2 is conveniently mounted within the body 12 of the fish fillet deboner 10. The electric motor 40 includes a drive sprocket 42 which drives a toothed chain or drive belt 44. Good results have been obtained through use of a rubber drive belt 44. Drive belt 44 also goes around a slave sprocket 46 which is mounted on an axle 48. The bone pulling cylinder 38 is also mounted on the axle 48 and the electric motor drives the drive sprocket 42 which, in turn, drives the drive chain 44 which, in turn, drives the slave sprocket 46. The axle 48 is caused to rotate, thereby rotating bone pulling cylinder 38. The drive belt 44 is, in turn, covered by a guard 16 (shown in FIG. 1). As a majority of people are right-handed, it is preferred to mount the drive belt 44 and the chain guard 16 on the left of the device 10. However, it will be appreciated by those skilled in the art that these could also be placed on the right-hand side, if preferred.

The electric motor 40 is controlled by a pair of switches 18, 19 on the front of the device 10 (FIG. 1). Toggle switch 19 permits the motor to be run in a forward, stopped, or reverse mode, in the event that anything gets caught. Dial 18 permits the speed of rotation of the motor 40 to be finely varied. The preferred motor is a low voltage direct current geared head motor, capable of withstanding a high torque at low revolutions.

A vacuum manifold 50, shown in FIG. 3, ensures that the vacuum applied through vacuum connection 22 is placed across bone pulling cylinder 38. The resulting air flow in the manifold 50 is indicated by arrows 52.

Also shown in FIG. 3 is a fish fillet 60 resting skin side up on the upper surface 14. The fish fillet 60 includes skin 62, a fleshy body 63 and a plurality of pin bones, one of which is illustrated at 64.

The bone pulling cylinder 38 is most preferably in the form of a cylindrical drum which is caused to rotate by said electrical motor 40 in a clockwise direction (as drawn) indicated by arrows 54 in FIG. 3. The outer surface of the bone pulling cylinder 38 has a plurality of holes formed in it as shown in FIG. 3a. These holes are referred to as bone registering openings 70. Most preferably, the bone registering openings 70 have a larger diameter at the outer perimeter, and a smaller diameter at the inner perimeter (when the bone pulling cylinder 38 is viewed in cross-section) as shown in FIG. 3. Although satisfactory results have been achieved with a bell-shaped shoulder, as shown at 72 in FIG. 4, other shaped shoulders may also be appropriate. Preferably, the bone registering openings are between 1/16 and 1/2 inches in diameter and, most preferably, the bone registering openings 70 at the outer perimeter are about 3/16 inches in diameter. The most preferred size of the bone registering openings 70 will vary depending upon the type of fish fillet being deboned. For fish fillets having larger pin bones, slightly larger bone registering openings 70 are preferred. Conversely, for smaller fish fillets having smaller pin bones, smaller bone registering openings 70 are preferred. For fresh water trout, the 3/16 inch diameter holes yield satisfactory results.

It will be noted that the bone registering openings 70 are formed with sharp edges 71 in cross-section, i.e., approximately 90 degree edges. These sharp edges are important for snagging the pin bones to drag the pin bones out of the fish fillet 60 as described in more detail below. The most preferred material for the bone pulling cylinder 38 is stainless steel, although other food grade non-corroding materials may also be used.

It is preferred, for ease of operation of the device 10, to have the bone registering openings 70 sweep over all of the exposed surface of the fish fillet from which bones are to be removed. Therefore, it is most preferred to have the bone registering openings 70 in a staggered pattern across the entire surface of bone pulling cylinder 38.

As the bone pulling cylinder 38 is rotated, the sharp edges 71 formed on the bone registering openings 70, act to snag the ends of any protruding pin bones. In some species the bones may have thicker ends, but they do not typically have enlarged heads. Once snagged in a bone registering opening 70, the continued rotation of the bone pulling cylinder 38 will create an axial force or pull on the pin bone 64. Because the pull is generally aligned with the axis of the pin bone 64, it has been found that the pin bone 64 easily and without any separation of flesh, pulls out of the fish fillet 62. With this method of bone removal, there is very little flesh loss, in the order of less than 1% which may vary according to flesh consistency).

An important feature of the invention is the configuration of the puller plate 32. The puller plate 32 has a leading edge adjacent the fillet registering opening 36 which is made relatively thin (in the order of 0.010–0.015 in.) as possible over a predetermined width thereof to maximize the resiliency and flexibility required to accommodate pin bones 64 received between the bone pulling cylinder 38 and the puller plate 32, and to engage pin bones 64 which may protrude only a small distance from the fleshy body 63 of a fillet 60.

The profile of a forward portion of the puller plate 32 as shown in cross-section in the accompanying drawings is designed to be concentric with the surface of the bone pulling cylinder 38 over a selected arc length of the bone pulling cylinder. Before emerging into the vacuum manifold 50, snagged pin bones 64 are released from the bone pulling cylinder 38 and the puller plate 32 into a gap 80 defined by a trailing portion 33 of the puller plate 32 which is profiled to have a radius of curvature that exceeds the radius of curvature of the bone pulling cylinder 38.

The relative position of the puller plate 32 to the bone pulling cylinder 38 must be maintained to ensure conformity between the outer cylindrical surface of the bone pulling cylinder 38 and the profiled forward portion of the puller plate 32. Such conformity allows a minimum pressure and tension to be applied to a snagged pin bone 64 so as to permit the entire pin bone 64 to be withdrawn. Otherwise, if the pressure is released, a snagged pin bone may snap and break away or slip and remain in the flesh of the fish fillet. In Applicant's apparatus, many pin bones emerging from the fish fillet deboner 10 are actually flattened.

Conformity between the outer surface of the bone pulling cylinder 38 and the profiled forward portion of the puller plate 32 is achieved by sliding the puller plate 32, as required, toward the bone pulling cylinder 38 which is fixed on the mounting axle 48, such adjustment being permitted by the elongated slots 34a that receive threaded fasteners 37. The relative position of the puller plate 32 to the bone pulling cylinder 38 is maintained by bolting the fasteners 37 to the surface 14 of the underlying body 12. Tightening the fasteners 37 also pulls the puller plate 32 down onto the surface of the bone pulling cylinder 38.

The tension applied to the leading edge of the puller plate 32 is controlled by a compressions slot 34b formed in the puller plate beneath the upper surface thereof and extending from the forward portion of the puller plate adjacent to the bone pulling cylinder 38 through the mounting openings 34 provided in the puller plate 32. By varying the penetration of the fasteners 37 in the body 12, the tension applied to the leading edge of the puller plate may be adjusted, as required. It will be noted that the puller plate 32 is fixed relative to the bone pulling cylinder 38 so that the pin bone receiving space between the puller plate 32 and the bone pulling cylinder 38 does not increase to accommodate any snagged bones. The inherent resiliency of the thin leading edge of the puller plate 32 and the magnitude of the tension applied through the fasteners 37 to pre-stress the forward portion of the puller plate 32 will define the size of the pin bone which will be admitted into the pin bone receiving space. Thus, while the thin leading edge of the puller plate may flex, the remainder of the puller plate is fixed.

A compression slot 34c similar to compression slot 34b may be defined in guide plate 30 for adjusting the position of guide plate 30 relative to bone pulling cylinder 38.

Figure 4:
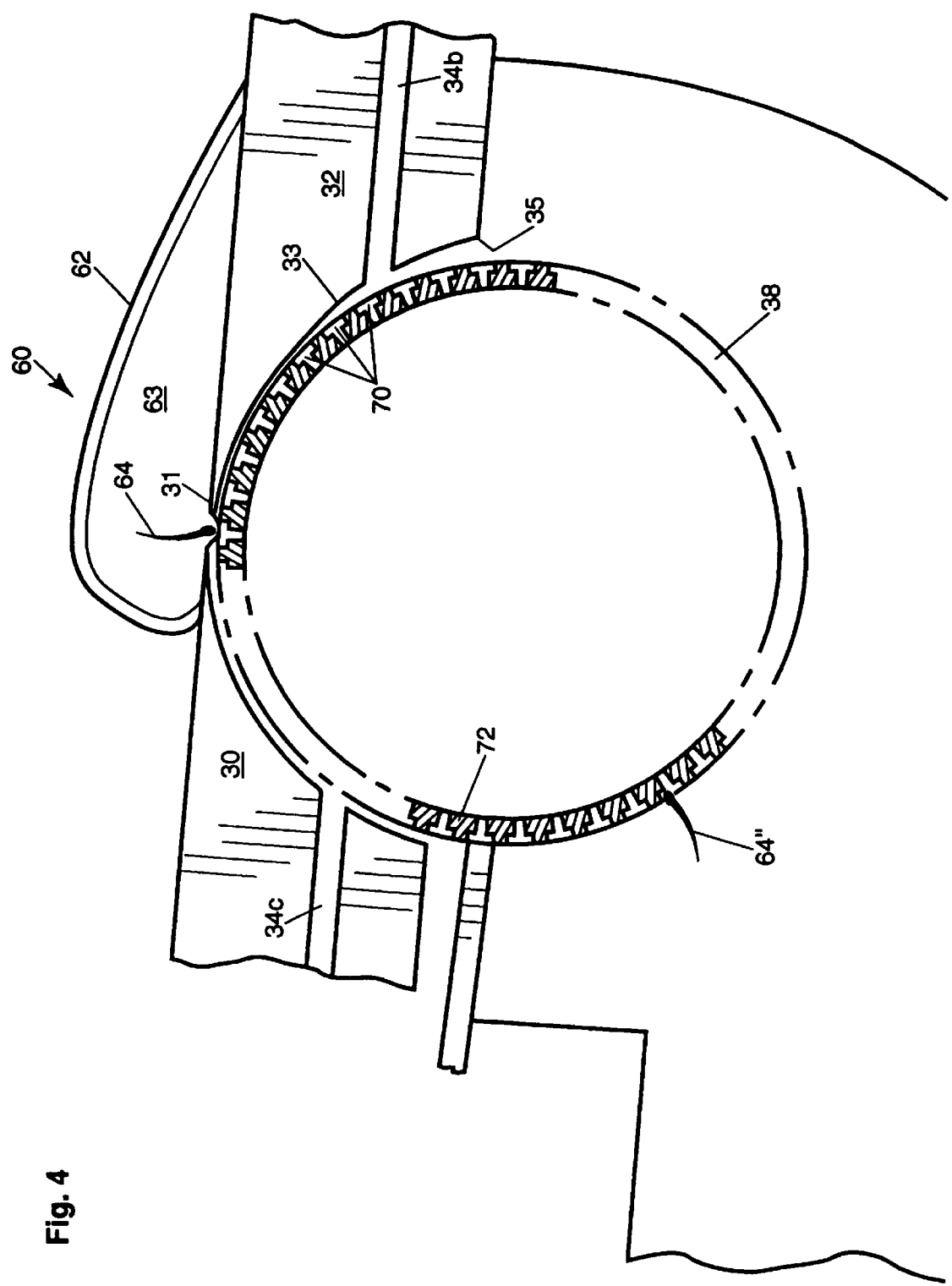
FIG. 4 is a similar view to FIG. 3 and shows a fish fillet ready to start pin bone removal.
Figure 5:
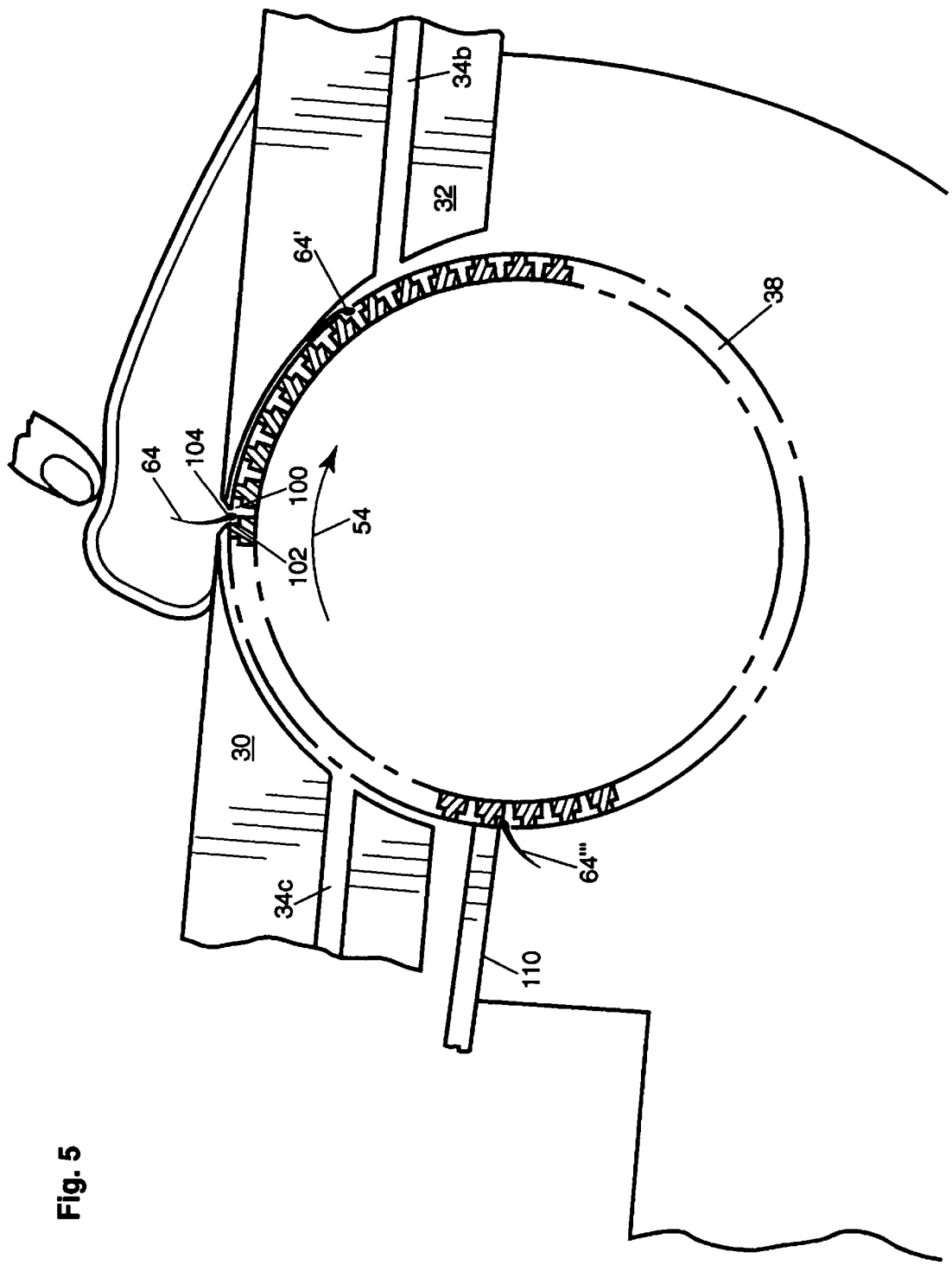
FIG. 5 is a similar view to FIG. 3 and a pin bone engaging the bone pulling cylinder.

Turning now to FIG. 4, it can be seen how the fillet 60 with the pin bone 64 is to be positioned. In FIG. 5, the pin bone 64 is engaged in a particular bone registering opening 100 and is snagged by sharp corner 102 just past a head 104 of the pin bone 64. It can also be seen that the axial path of the pin bone 64" as the bone pulling cylinder rotates in accordance with arrow 54 causes it to be drawn out of the fish fillet 60.

Figure 6:
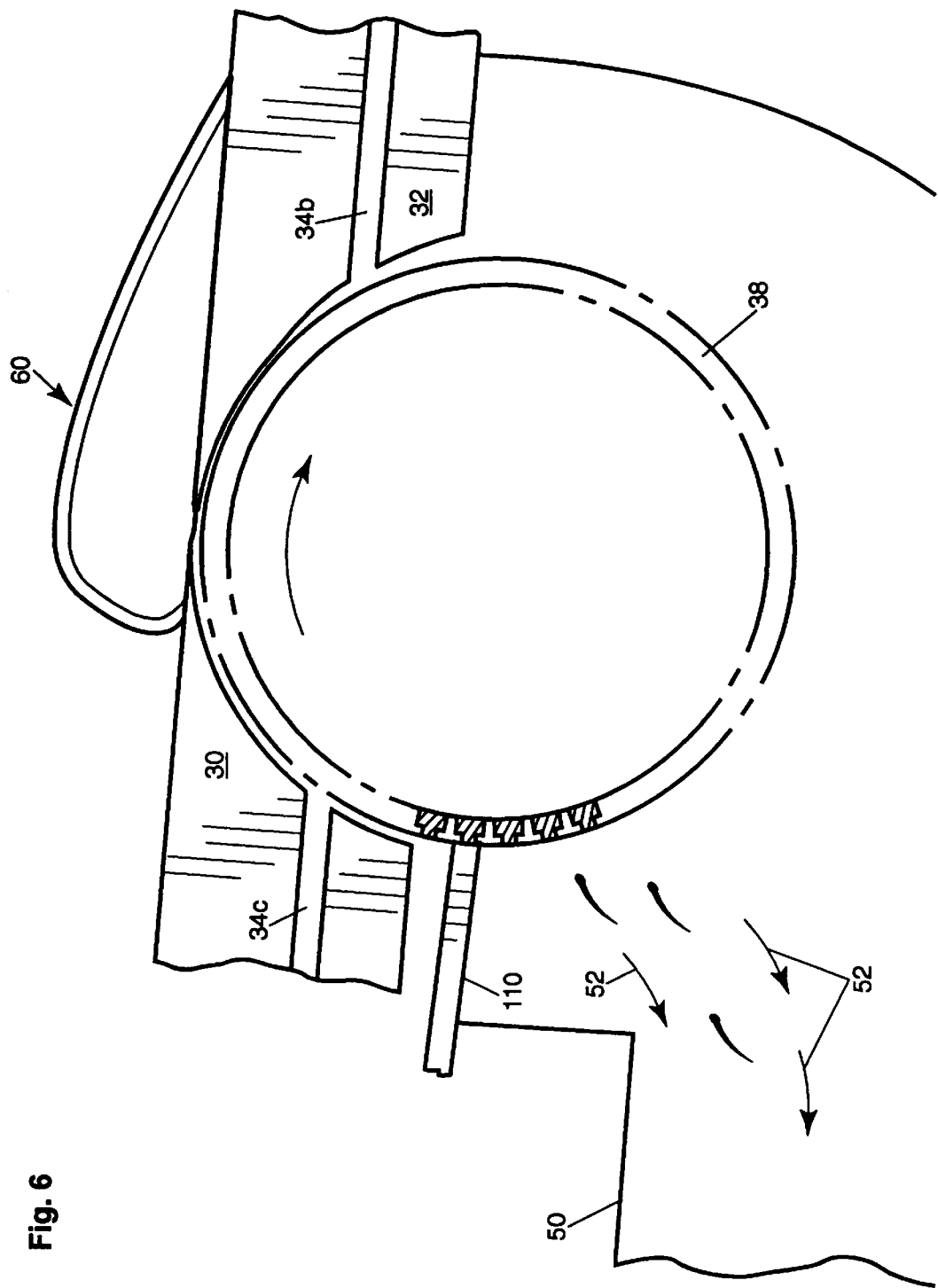
FIG. 6 is a similar view to FIG. 3 and shows a pin bone removed from the fillet and exiting the deboning device.

Turning again to FIG. 4, it can be seen that the pin bone 64 has moved along and is indicated by the numeral 64". As the bone pulling cylinder 70 continues to rotate in the direction of arrow 54, the pin bone 64" is dragged along past the puller plate 32, and is eventually freed beyond the end of the trailing edge 33 which is indicated at 35. At this point, the pin bone 64" will either fall away as shown in FIG. 6 or remain loosely attached to the bone pulling cylinder 38. Attachment may occur because of moisture, wetness or other substances causing the pin bon 64" to remain stuck to the surface of the bone pulling cylinder 38 (shown as 64''' in FIG. 5). Therefore, according to the present invention, there is also preferably provided a scraper blade 110 which is used to scrape any such bones which remain attached to the bone registering openings 70 of the bone pulling cylinder 38 prior to the bone pulling cylinder 38 making a full rotation. Although the scraper blade 110 is shown separated from plate 30, it is also capable of being positioned flush against the underside of plate 30. This may be preferred, in some cases, the prevent the blade 110 from riding up and over caught bones. The pin bones are drawn away from the bone pulling cylinder 38 by means of a vacuum or suction 52 facilitated by the vacuum manifold 50.

Of course, due to the nature of the application, all of the material from which the device 10 is made should be made of food grade quality. This applies to the upper plates 26, 30, 32 and 28, as well as to the body 12 with the tray 20. The bone pulling cylinder 38 is formed preferably from stainless steel or other high quality metal which will not corrode. In addition, the fiberglass body, stainless steel and nickel components should be easy to assemble and disassemble in order to adjust their relative spacing for different fish species and to make it easy to clean after, for example, a shift change or the like.

The drive through the electric motor is preferably through a DC motor which is wired to an AC/DC convertor. This allows the drive to be infinitely variable in terms of speed through speed control knob 18. The speed of rotation of the bone pulling cylinder 38 will be selected according to the nature of the fish and the degree of rigor mortis. It has been found that the preferred operating speed is usually from about 40 to 50 r.p.m. for fresh water fish such as trout.

To utilize the equipment, the operator places the fillet meat side down and skin side up on the body 12. Then the fillet should be placed to cause the pin bones to be aligned with the bone fillet registering opening 36, allowing them to contact the bone pulling cylinder 38. In this position, the fillet should have the belly edge towards the operator so that the pin bones will be removed on an angle approaching the natural disposition of the pin bones in the flesh in order to minimize meat loss, as indicated above. The operator may apply gentle finger pressure on the skin side of the fish fillet (FIG. 5) to cause the bones to protrude slightly from the flesh. Once snagged by the pin bones, the fillet tends to self-align with the fillet registering opening 36 and typically all of the bones will be removed in a single pass. If any of the bones tend to be snapped off, it is necessary to lower the speed of rotation of the bone pulling cylinder to allow for a more gentle gripping and removal of the pin bones.

It will be appreciated that the upper surface 14 of the body 12 is sloped to improve the ergonomics of the device, to assist the operator. Such a sloped upper surface is preferred but not essential, as other configurations may also be used to assist operators. It will also be appreciated that, unlike prior art devices, the device according to the invention is self-supporting and does not have to be held by the operator. This greatly relieves fatigue in the operator and the operation of the device produces more consistent results.

It is preferable to have a water supply nearby to clean the working surface and the bone pulling cylinder periodically.

Water and other wastes are then caught in the drip tray 20 which is preferably molded right into the body 12. Then the drain 21 can be used to ensure that an overflow does not occur.

It is also preferred to provide an on/off/reverse switch which should be located on the front of the device so that the operator may shut down the machine or reverse the bone pulling cylinder 38 in case of a sudden jamming.

Figure 7:
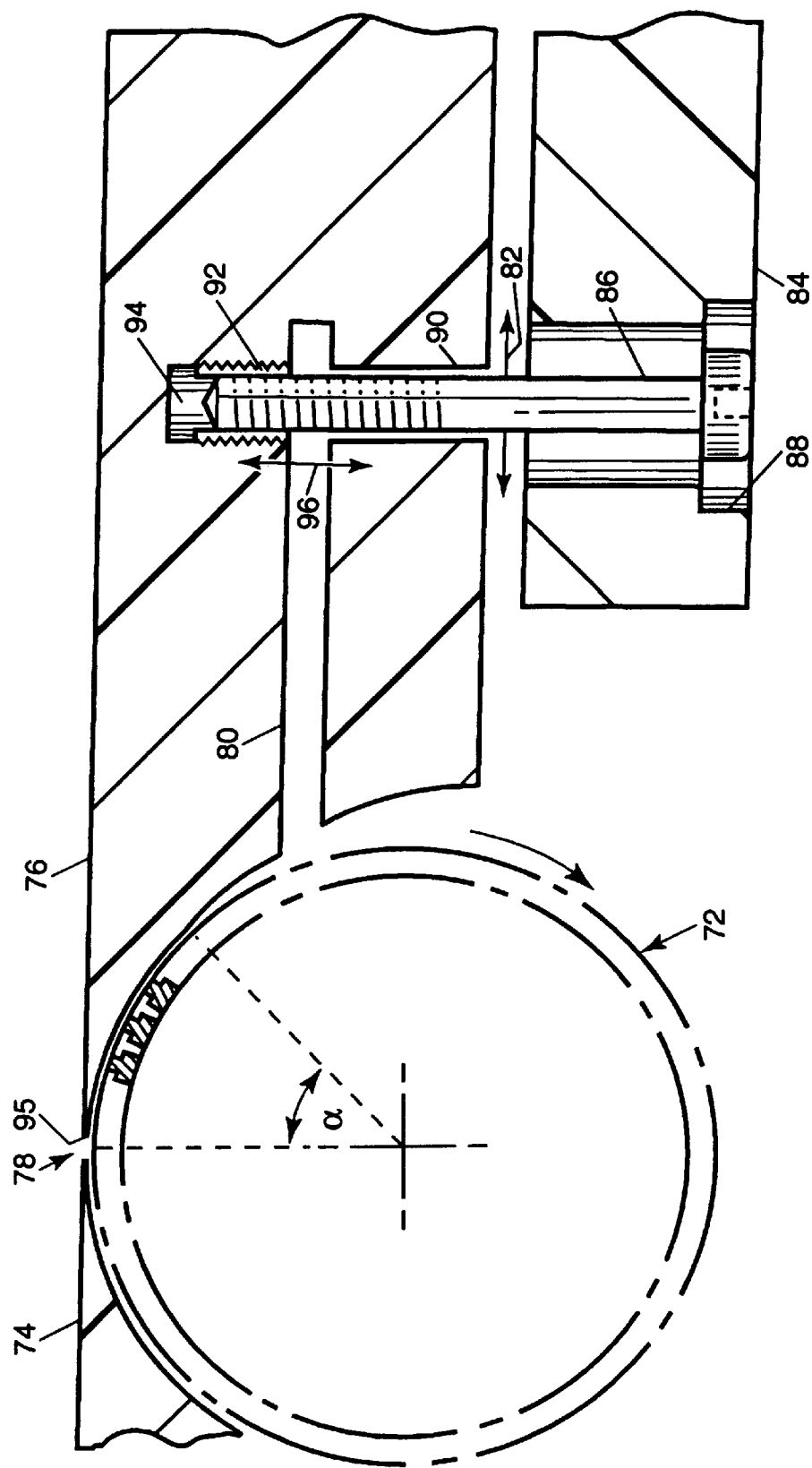
FIG. 7 is a similar view to FIG. 3, drawn to a larger scale, showing a first alternative embodiment of the invention.

An alternative embodiment of the invention is drawn in FIG. 7 in which the bone pulling cylinder is generally indicated by numeral 72, and the associated guide plate and puller plate are indicated by numerals 74, 76 respectively. A fillet registering opening 78 is defined by a gap between the guide plate and puller plate 74, 76 and is vertically aligned with the axis of rotation of the bone pulling cylinder 72. A compression slot 80 is formed in the puller plate 76 beneath an upper surface thereof and extends from a forward portion of the puller plate adjacent to the bone pulling cylinder 72. The forward portion of the puller plate 76 adjacent to the bone pulling cylinder is profiled to have a radius of curvature which is commensurate with the radius of curvature of the cylindrical surface of the bone pulling cylinder over a selected arc length corresponding to the angle a shown in the drawings. The arc length is selected to be of sufficient length to apply α tension to a snagged pin bone which will exceed the force of retension of the bone in the fish fillet.

The puller plate 76 is slid in the direction indicated by arrow 82 relative to a fixed body 84 so as to bring the profiled forward portion of the puller plate to an operative position where the forward portion mates with the bone pulling cylinder 72 over the above-referenced selected arc length. To maintain the operative position, coupling means in the form of a bolt 86 are provided to couple the puller plate 76 to the body 84. The body 84 has a slotted opening 88 to accommodate movement of the bolt 86 in the direction indicated by arrow 82. A corresponding mounting opening 90 is formed in the puller plate 76 and is lined with a Helicoil™ insert 92 which is threaded to receive the bolt 86.

It will be noted that the bolt 86 and the mounting opening 90 for the bolt are disposed across the compression slot 80 and terminate in a blind hole 94 spaced beneath the upper surface of the puller plate 76. In this way, tensioning of the bolt 86 will operate to narrow the gap defined by the compression slot 80 and pre-stress the leading edge 95 of the puller plate 76, as indicated by directional arrow 96.

It will be appreciated that the compression slot 80 will extend throughout the length of the puller plate 76 and be commensurate with the length of the associated bone pulling cylinder 72. In order to maintain a minimum pre-determined tension to the leading edge 94 of the puller plate 76, a plurality of bolts 86 will be used to apply the required tension and these will be placed at pre-determined intervals along the length of the compression slot 80.

In the embodiment shown in FIG. 7, the compression slot 80 extends from the forward portion of the puller plate 76 adjacent to the bone pulling cylinder 72 through the mounting openings 90. It is preferable that the bolt used to apply tension to the leading edge to be discrete from the bolt used to adjust the relative position of the puller plate to the bone pulling cylinder.

Figure 8:
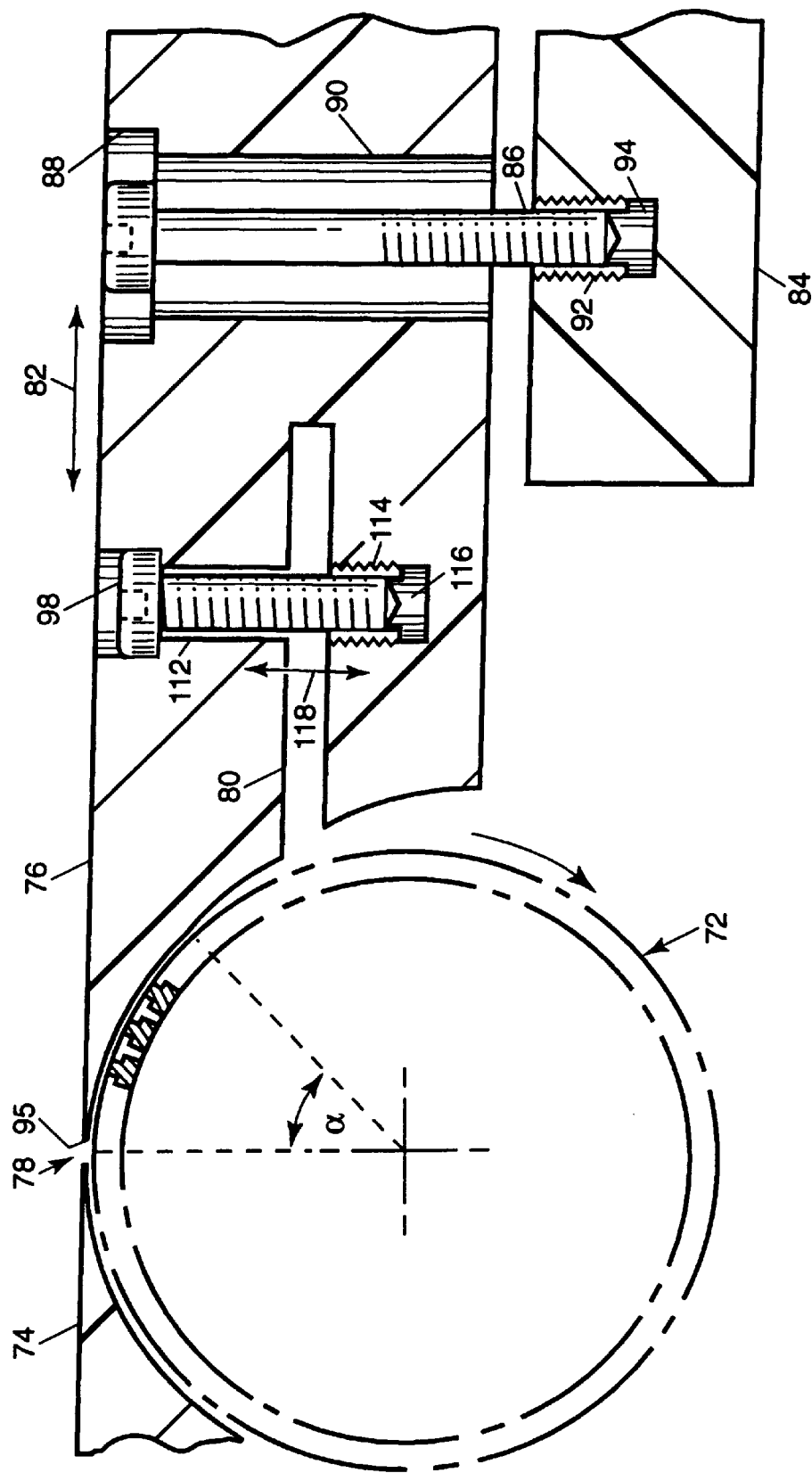
FIG. 8 is a similar view to FIG. 3, drawn to a larger scale, showing a second alternative embodiment of the invention.

Accordingly, in FIG. 8, there is illustrated yet another embodiment of the invention in which discrete fasteners are provided to perform these two functions. For convenience, like parts in FIGS. 7 and 8 are identified by like numerals.

Here it will be seen that the mounting opening 90 for receiving the coupling bolt 86 is remote from the bone pulling cylinder 72 and traverses the entire height of the puller plate 76. The slotted opening 88 whereby the fore and aft position of the puller plate 76 may be adjusted relative to the body 84 so as to bring the forward portion of the puller plate into its operative position on the bone pulling cylinder 72 is accessible from the top surface of the puller plate 76. In this embodiment, a blind hole 94 is formed in the body 84 and lined with insert 92 which is threaded to engage the bolt 86.

An adjustable tension member in the form of a bolt 98 is received in a respective opening 112 lined with an insert 114 and aligned with a corresponding blind hole 116 formed in the puller plate 76 on the opposite side of the compression slot 80. The tension applied to the bolt 98 may thus be used to perform fine adjustments indicated by directional arrow 118 whereby the tension applied to the leading edge 95 may be independently controlled.

It will be understood that the bolt-receiving openings 112, 90 formed in the puller plate 76 are preferably spaced from the upper surface of the plate and accessible from the bottom of the plate (as shown in FIG. 7) in order to provide a smooth working surface for laying down the fish. Other variations may be made to the above-described embodiments of the invention within the scope of the appended claims. It will be understood that snagged bones emerging from the bone pulling cylinder may simply fall by gravity and that a vacuum manifold is an attractive but unnecessary feature. Similarly, providing a scraper plate to dislodge snagged bones which remain caught in the bone pulling cylinder may be supplanted by the use of a plurality of water-spray nozzles. Inevitably, the working environment will be wet and therefore the drain tray and overflow may be optional.

Thus, it will be appreciated by those skilled in the art that, while the foregoing makes reference to certain specific embodiments of the invention, many variations and adaptations are possible within the broad scope of the invention. Some of these have been discussed above and others will be apparent to those skilled in the art. However, the scope of the invention is to be considered as defined by the appended claims.

We claim:

1. In apparatus for removing pin bones from fish fillets, the apparatus having a rotatable bone pulling cylinder and a puller plate defining a pin bone receiving space therebetween, the bone pulling cylinder having an apertured cylindrical surface adapted to snag pin bones extending from a fish fillet disposed adjacent said bone pulling cylinder and puller plate, the puller plate having a forward portion profiled to have a radius of curvature which is commensurate with the radius of curvature of said cylindrical surface, the improvement in which:

the puller plate is slidably mounted to a body and adapted to be slid toward the bone pulling cylinder to bring the forward portion of the puller plate to an operative position where the forward portion mates with the bone pulling cylinder over a selected arc length of the bone pulling cylinder;

the apparatus additionally having coupling means adapted to couple the puller plate to the body and maintain said operative position, during rotation of the bone pulling cylinder;

a resilient leading edge on said forward portion of the puller plate;

and tensioning means adapted to apply a predetermined tension to said resilient leading edge of the puller plate over substantially the entire length of the puller plate adjacent the bone pulling cylinder whereby said leading edge is adapted to flex in order to admit pin bones snagged by said bone pulling cylinder into said pin bone receiving space, any pin bones received into said pin bone receiving space being squeezed between the puller plate and bone pulling cylinder upon continued rotation of the bone pulling cylinder as the pin bones are withdrawn from the fish fillet.

2. Apparatus according to claim 1 in which mounting openings are provided in the puller plate and the body, and fasteners are received in said mounting openings to couple the puller plate to the body, the fasteners being adapted to apply a minimum predetermined tension to the leading edge of the puller plate.

3. Apparatus according to claim 2 in which the fasteners are threaded to vary the penetration of the fasteners in said body and to adjust the tension applied to the leading edge of the puller plate.

4. Apparatus according to claim 3 in which the puller plate has a compression slot formed in the puller plate beneath an upper surface thereof and extending from the forward portion of the puller plate adjacent to the bone pulling cylinder through the mounting openings.

5. Apparatus according to claim 1 in which the puller plate has a compression slot formed in the puller plate beneath an upper surface thereof and extending from the forward portion of the puller plate adjacent to the bone pulling cylinder, the apparatus including at least one adjustable tension member disposed across the compression slot and adapted to apply a selected predetermined tension to the leading edge of the puller plate.

6. Apparatus according to claim 5 having a plurality of tension members distributed along the length of the puller plate and adapted to apply a minimum tension to the leading edge of the puller plate throughout the length thereof.

7. Apparatus according to claim 1 having a guide plate adjacent the puller plate and defining a fillet registering opening therebetween which is vertically aligned with an axis of rotation of the bone pulling cylinder.

* * * * *